(12) United States Patent
Kang

(10) Patent No.: US 10,921,586 B2
(45) Date of Patent: Feb. 16, 2021

(54) IMAGE PROCESSING METHOD AND APPARATUS IN VIRTUAL REALITY DEVICE

(71) Applicant: HUAWEI TECHNOLOGIES CO., LTD., Guangdong (CN)

(72) Inventor: Junteng Kang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/093,263

(22) PCT Filed: Apr. 14, 2016

(86) PCT No.: PCT/CN2016/079327
§ 371 (c)(1),
(2) Date: Oct. 12, 2018

(87) PCT Pub. No.: WO2017/177425
PCT Pub. Date: Oct. 19, 2017

(65) Prior Publication Data
US 2019/0204597 A1    Jul. 4, 2019

(51) Int. Cl.
*G06F 3/01*    (2006.01)
*G02B 27/01*   (2006.01)
*G06T 19/00*   (2011.01)

(52) U.S. Cl.
CPC ..... *G02B 27/0101* (2013.01); *G02B 27/0172* (2013.01); *G06F 3/012* (2013.01);
(Continued)

(58) Field of Classification Search
CPC ............. G06T 19/006; G02B 27/0172; G02B 2027/0178; G02B 2027/014;
(Continued)

(56) References Cited

U.S. PATENT DOCUMENTS 5,859,370 A    1/1999 Suh et al.
2009/0237564 A1 9/2009 Kikinis et al.
(Continued)

FOREIGN PATENT DOCUMENTS

CN    103885181 A    6/2014
CN    103885182 A    6/2014
(Continued)

OTHER PUBLICATIONS

International Search Report and Written Opinion issued in International Application No. PCT/CN2016/079327 dated Dec. 30, 2016, 51 pages.
(Continued)

*Primary Examiner* — Kent W Chang
(74) *Attorney, Agent, or Firm* — Fish & Richardson P.C.

(57) ABSTRACT

An image processing method and apparatus in a virtual reality device are provided. The method includes determining, according to a visual acuity status of a user of a virtual reality device, a filtering parameter corresponding to visual acuity of the user. For an image played on the virtual reality device, an inverse filtering processing is performed on the image according to the determined filtering parameter. An image obtained after the inverse filtering processing is then displayed on a screen of the virtual reality device. Embodiments of the present invention also provide a device and a terminal for such image processing.

17 Claims, 3 Drawing Sheets

(52) U.S. Cl.
CPC ............ *G06F 3/013* (2013.01); *G06T 19/006* (2013.01); *G02B 2027/014* (2013.01); *G02B 2027/0127* (2013.01); *G02B 2027/0134* (2013.01); *G02B 2027/0143* (2013.01); *G02B 2027/0178* (2013.01); *G06F 2203/011* (2013.01)

(58) Field of Classification Search
CPC ........ G02B 2027/0118; G02B 27/0101; G06F 3/013; G06F 3/012
See application file for complete search history.

(56) References Cited

U.S. PATENT DOCUMENTS

| | | | |
|---|---|---|---|
| 2014/0168034 A1* | 6/2014 | Luebke | G06F 3/013 345/8 |
| 2014/0168035 A1 | 6/2014 | Luebke et al. | |
| 2017/0205877 A1 | 7/2017 | Qin | |
| 2018/0190038 A1 | 7/2018 | Luebke et al. | |

FOREIGN PATENT DOCUMENTS

| | | |
|---|---|---|
| CN | 104111535 A | 10/2014 |
| CN | 204101815 U | 1/2015 |
| CN | 104618710 A | 5/2015 |
| CN | 204389787 U | 6/2015 |
| CN | 104808341 A | 7/2015 |
| CN | 104811687 A | 7/2015 |
| CN | 204496115 U | 7/2015 |
| CN | 104914575 A | 9/2015 |
| CN | 104932106 A | 9/2015 |

OTHER PUBLICATIONS

Office Action issued in Chinese Application No. 201680023778.1 dated Apr. 22, 2019, 8 pages.
Office Action issued in Chinese Application No. 201680023778.1 dated Oct. 30, 2019, 9 pages.

* cited by examiner

IMAGE PROCESSING METHOD AND APPARATUS IN VIRTUAL REALITY DEVICE

CROSS-REFERENCE TO RELATED APPLICATIONS

This application is a national stage of International Application No. PCT/CN2016/079327, filed on Apr. 14, 2016, which is hereby incorporated by reference in its entirety.

TECHNICAL FIELD

The present invention relates to the field of wireless communications technologies, and in particular, to an image processing method and apparatus in a virtual reality device.

BACKGROUND

A virtual reality head-mounted display device, referred to as a virtual reality (Virtual Reality, VR) head-mounted display or VR glasses, is a product that combines a plurality of technologies such as a simulation technology, computer graphics, a man-machine interface technology, a multimedia technology, a sensing technology, and a network technology, and is a new human-computer interaction manner that is created by using a computer and a latest sensor technology. A helmet-mounted display is used to prevent a user from viewing the outside, and guide the user to experience a feeling of being in a virtual environment, and can provide the user with stereoscopic and real visual effects. A display principle of the helmet-mounted display is that left and right eye screens respectively display left and right eye images, and after eyes obtain such differential information, a stereoscopic sense occurs in mind.

The VR glasses generally perform imaging in a "lens+screen" manner. For a nearsighted user, at present, a distance between a lens and eyes is adjusted to adapt to users with different myopic degrees. Because adjustment is performed by moving a lens, precision is low, and user experience is degraded.

SUMMARY

Embodiments of the present invention provide an image processing method and apparatus in a virtual reality device, to resolve a problem that precision is low and user experience is degraded because existing VR glasses are adjusted by moving a lens to adapt to users with different myopic degrees.

According to a first aspect, an image processing method in a virtual reality device is provided, including:

determining, according to a visual acuity status of a user of the virtual reality device, a filtering parameter corresponding to visual acuity of the user;

for an image played on the virtual reality device, performing inverse filtering processing on the image according to the determined filtering parameter; and displaying, on a screen of the virtual reality device, an image obtained after the inverse filtering processing.

In a possible implementation, the determining, according to a visual acuity status of a user of the virtual reality device, a filtering parameter corresponding to visual acuity of the user includes:

determining, according to a preset correspondence, the filtering parameter corresponding to the visual acuity of the user, where the correspondence includes a correspondence between visual acuity and a filtering parameter.

In a possible implementation, before the determining, according to a visual acuity status of a user of the virtual reality device, a filtering parameter corresponding to visual acuity of the user, the method further includes:

after a voice collection instruction is received, collecting voice information, and determining the visual acuity of the user from the voice information; or determining the visual acuity of the user according to received input information after an information input instruction is received.

In a possible implementation, the determining, according to a visual acuity status of a user of the virtual reality device, a filtering parameter corresponding to visual acuity of the user includes:

after a calibration instruction is received, playing a video sample on the screen of the virtual reality device;

sequentially performing inverse filtering processing on an image in the video sample according to filtering parameters in a filtering parameter set, and displaying, on the screen, an image obtained after the inverse filtering processing; and determining that the user views a clear image, and determining, as the filtering parameter corresponding to the visual acuity of the user, a filtering parameter used for the current image.

In a possible implementation, the method further includes:

after the sequentially performing inverse filtering processing on an image in the video sample according to filtering parameters in a filtering parameter set, determining that the user does not view a clear image, and updating the filtering parameters in the filtering parameter set;

sequentially performing inverse filtering processing on the image in the video sample according to updated filtering parameters in the filtering parameter set, and displaying, on the screen, an image obtained after the inverse filtering processing; and determining that the user views a clear image, and determining, as the filtering parameter corresponding to the visual acuity of the user, a filtering parameter used for the current image.

In a possible implementation, the determining that the user views a clear image includes: after a determining instruction is received, determining that the user views a clear image.

In a possible implementation, a cover film including a pinhole array is disposed on the screen.

According to a second aspect, an image processing apparatus in a virtual reality device is provided, including:

a parameter determining module, configured to determine, according to a visual acuity status of a user of the virtual reality device, a filtering parameter corresponding to visual acuity of the user;

a processing module, configured to: for an image played on the virtual reality device, perform inverse filtering processing on the image according to the determined filtering parameter; and a display module, configured to display an image obtained after the inverse filtering processing.

In a possible implementation, the parameter determining module is specifically configured to:

determine, according to a preset correspondence, the filtering parameter corresponding to the visual acuity of the user, where the correspondence includes a correspondence between visual acuity and a filtering parameter.

In a possible implementation, the parameter determining module is further configured to:

after a voice collection instruction is received, collect voice information, and determine the visual acuity of the user from the voice information; or determine the visual acuity of the user according to received input information after an information input instruction is received.

In a possible implementation, the processing module is specifically configured to:

after a calibration instruction is received, control the display module to play a video sample;

sequentially perform inverse filtering processing on an image in the video sample according to filtering parameters in a filtering parameter set, and control the display module to display an image obtained after the inverse filtering processing; and determine that the user views a clear image, and control the parameter determining module to determine, as the filtering parameter corresponding to the visual acuity of the user, a filtering parameter used for the current image.

In a possible implementation, the processing module is further configured to:

determine that the user does not view a clear image, and update the filtering parameters in the filtering parameter set;

sequentially perform inverse filtering processing on the image in the video sample according to updated filtering parameters in the filtering parameter set, and control the display module to display an image obtained after the inverse filtering processing; and determine that the user views a clear image, and control the parameter determining module to determine, as the filtering parameter corresponding to the visual acuity of the user, a filtering parameter used for the current image.

In a possible implementation, the processing module is specifically configured to: after a determining instruction is received, determine that the user views a clear image.

In a possible implementation, the apparatus is the virtual reality device; or the apparatus is disposed in the virtual reality device, and the terminal is connected to the virtual reality device by using an interface.

According to a third aspect, a computer readable storage medium is provided, where the computer readable storage medium stores executable program code, and the program code is used to implement the method according to the first aspect.

According to a fourth aspect, a virtual reality device is provided, including a processor, an input interface, a screen, a memory, and a system bus.

The processor is responsible for a logical operation and processing. When the virtual reality device runs, the processor reads a program in the memory, to perform the following operations: determining, according to a visual acuity status of a user of the virtual reality device, a filtering parameter corresponding to visual acuity of the user; and for an image played on the virtual reality device, performing inverse filtering processing on the image according to the determined filtering parameter; and the screen is configured to display, under control of the processor, an image obtained after the inverse filtering processing.

In a possible implementation, the processor reads the program in the memory, to specifically perform the following operation:

determining, according to a preset correspondence, the filtering parameter corresponding to the visual acuity of the user, where the correspondence includes a correspondence between visual acuity and a filtering parameter.

In a possible implementation, the processor reads the program in the memory, to further perform the following operation:

after the input interface receives a voice collection instruction, collecting voice information, and determining the visual acuity of the user from the voice information; or determining the visual acuity of the user according to received input information after an information input instruction is received.

In a possible implementation, the processor reads the program in the memory, to specifically perform the following operations:

after the input interface receives a calibration instruction, playing a video sample on the screen of the virtual reality device; sequentially performing inverse filtering processing on an image in the video sample according to filtering parameters in a filtering parameter set, and displaying, on the screen, an image obtained after the inverse filtering processing; and determining that the user views a clear image, and determining, as the filtering parameter corresponding to the visual acuity of the user, a filtering parameter used for the current image.

In a possible implementation, the processor reads the program in the memory, to further perform the following operations:

after the inverse filtering processing is sequentially performed on the image in the video sample according to the filtering parameters in the filtering parameter set, determining that the user does not view a clear image, and updating the filtering parameters in the filtering parameter set; sequentially performing inverse filtering processing on the image in the video sample according to updated filtering parameters in the filtering parameter set, and displaying, on the screen, an image obtained after the inverse filtering processing; and determining that the user views a clear image, and determining, as the filtering parameter corresponding to the visual acuity of the user, a filtering parameter used for the current image.

In a possible implementation, the processor reads the program in the memory, to specifically perform the following operation: after the input interface receives a determining instruction, determining that the user views a clear image.

In a possible implementation, a cover film including a pinhole array is disposed on the screen.

According to a fifth aspect, a terminal is provided, the terminal is disposed in a virtual reality device, and the terminal includes a processor, an input interface, a screen, a memory, a connection interface, and a system bus.

The processor is responsible for a logical operation and processing. When the terminal runs, the processor reads a program in the memory, to perform the following operations: determining, according to a visual acuity status of a user of the virtual reality device, a filtering parameter corresponding to visual acuity of the user; and for an image played on the virtual reality device, performing inverse filtering processing on the image according to the determined filtering parameter;

the screen is configured to display, under control of the processor, an image obtained after the inverse filtering processing; and the connection interface is configured to connect to the virtual reality device.

In a possible implementation, the processor reads the program in the memory, to specifically perform the following operation:

determining, according to a preset correspondence, the filtering parameter corresponding to the visual acuity of the user, where the correspondence includes a correspondence between visual acuity and a filtering parameter.

In a possible implementation, the processor reads the program in the memory, to further perform the following operation:

after the input interface receives a voice collection instruction, collecting voice information, and determining the visual acuity of the user from the voice information; or determining the visual acuity of the user according to received input information after the input interface receives an information input instruction.

In a possible implementation, the processor reads the program in the memory, to specifically perform the following operations:

after the input interface receives a calibration instruction, playing a video sample on the screen of the virtual reality device;

sequentially performing inverse filtering processing on an image in the video sample according to filtering parameters in a filtering parameter set, and displaying, on the screen, an image obtained after the inverse filtering processing; and determining that the user views a clear image, and determining, as the filtering parameter corresponding to the visual acuity of the user, a filtering parameter used for the current image.

In a possible implementation, the processor reads the program in the memory, to further perform the following operations:

after the inverse filtering processing is sequentially performed on the image in the video sample according to the filtering parameters in the filtering parameter set, determining that the user does not view a clear image, and updating the filtering parameters in the filtering parameter set;

sequentially performing inverse filtering processing on the image in the video sample according to updated filtering parameters in the filtering parameter set, and displaying, on the screen, an image obtained after the inverse filtering processing; and determining that the user views a clear image, and determining, as the filtering parameter corresponding to the visual acuity of the user, a filtering parameter used for the current image.

In a possible implementation, the processor reads the program in the memory, to specifically perform the following operation: after the input interface receives a determining instruction, determining that the user views a clear image.

In a possible implementation, the terminal further includes a cover film that includes a pinhole array and that is disposed on the screen; or the cover film including the pinhole array is disposed on a location in which the screen is located in the virtual reality device.

According to the method and the apparatus provided in the embodiments of the present invention, the filtering parameter corresponding to the visual acuity of the user is determined according to the visual acuity status of the user of the virtual reality device; and the inverse filtering processing is performed, by using the determined filtering parameter, on the image played on the virtual reality device, so that the user of the virtual reality device can view a clear image. Because when the user uses the virtual reality device, a distance between eyes of the user and the screen is fixed, inverse filtering processing may be performed so that the user of the virtual reality device can view a clear image.

According to a software adjustment manner used in the embodiments of the present invention, processing precision is high, so that the image displayed on the screen of the virtual reality device better matches the visual acuity status of the user, and user experience is improved.

DESCRIPTION OF EMBODIMENTS

To make the objectives, technical solutions, and advantages of the embodiments of the present invention clearer, the following clearly and completely describes the technical solutions in the embodiments of the present invention with reference to the accompanying drawings in the embodiments of the present invention. Apparently, the described embodiments are some but not all of the embodiments of the present invention. All other embodiments obtained by persons of ordinary skill in the art based on the embodiments of the present invention without creative efforts shall fall within the protection scope of the present invention.

The following further describes the embodiments of the present invention in detail with reference to the accompanying drawings of this specification. It should be understood that the embodiments described herein are merely used to explain the present invention but are not intended to limit the present invention.

Figure 1:
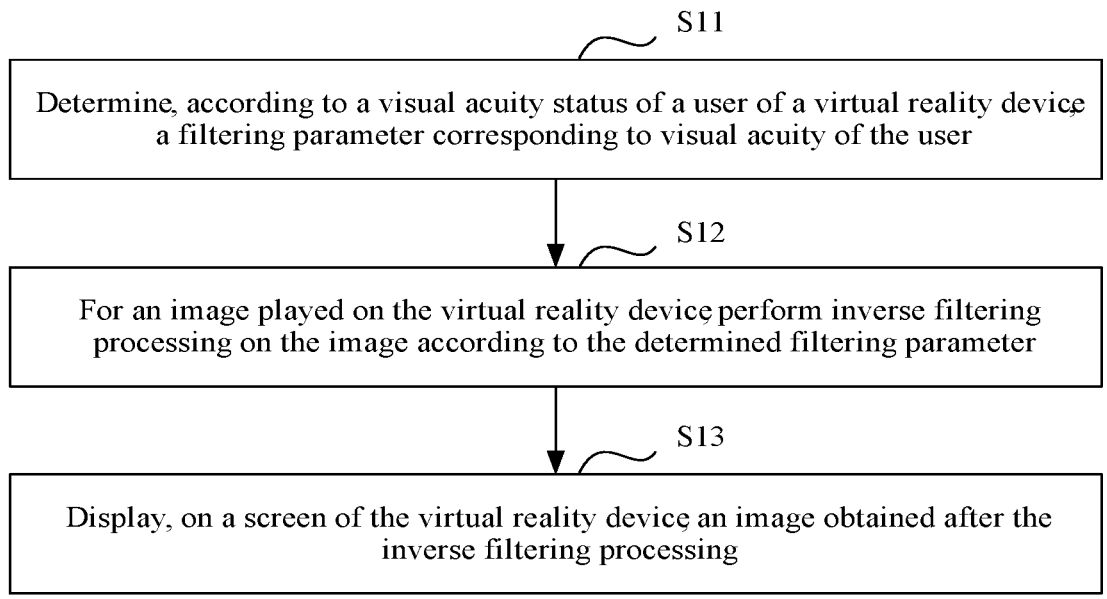
FIG. 1 is a schematic flowchart of an image processing method in a virtual reality device according to Embodiment 1 of the present invention.

Embodiment 1 of the present invention provides an image processing method in a virtual reality device. As shown in FIG. 1, the method includes the following steps.

S11. Determine, according to a visual acuity status of a user of the virtual reality device, a filtering parameter corresponding to visual acuity of the user.

For example, the visual acuity status of the user may be determined according to uncorrected visual acuity of the user, such as myopia, hyperopia, or astigmatism. For example, for a nearsighted user, a filtering parameter corresponding to a myopic degree of the user is determined according to the myopic degree. For another example, for a farsighted user, a filtering parameter corresponding to a hyperopic degree of the user is determined according to the hyperopic degree. For another example, for a user with normal vision, a corresponding filtering parameter may also be determined, and the determined filtering parameter is 0, that is, inverse filtering does not need to be performed.

S12. For an image played on the virtual reality device, perform inverse filtering processing on the image according to the determined filtering parameter, so that an image obtained after the inverse filtering processing is clear to the user.

S13. Display, on a screen of the virtual reality device, the image obtained after the inverse filtering processing.

If the virtual reality device is of an all-in-one structure, the screen is a screen included in the virtual reality device; or if the virtual reality device is of a split structure, the screen is a screen of a terminal (such as a mobile phone or a tablet computer) disposed in the virtual reality device.

In this embodiment of the present invention, the filtering parameter corresponding to the visual acuity of the user is determined according to the visual acuity status of the user of the virtual reality device; and the inverse filtering processing is performed, by using the determined filtering parameter, on the image played on the virtual reality device, so that the user of the virtual reality device can view a clear image. Because when the user uses the virtual reality device, a distance between eyes of the user and the screen is fixed, inverse filtering processing may be performed so that the user of the virtual reality device can view a clear image. According to a software adjustment manner used in this embodiment of the present invention, processing precision is high, so that the image displayed on the screen of the virtual reality device better matches the visual acuity status of the user, and user experience is improved.

Figure 2:
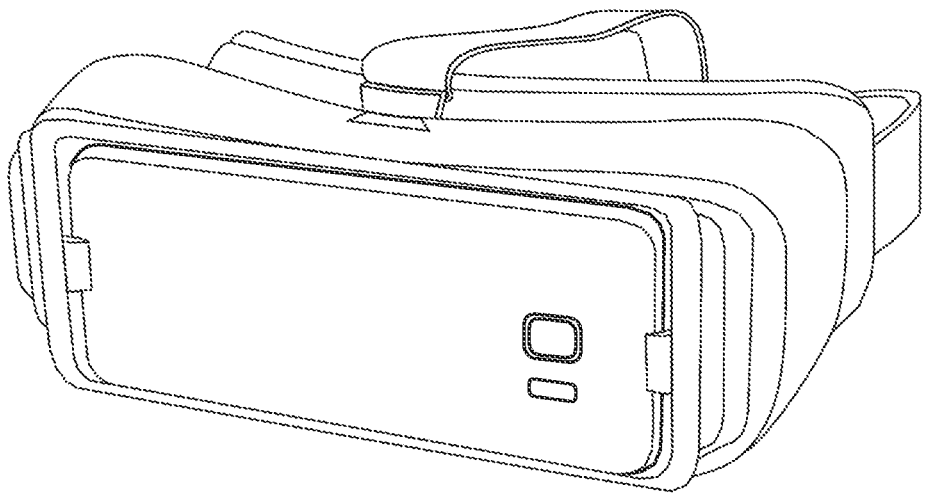
FIG. 2 is a possible schematic structural diagram of VR glasses.

The virtual reality device in this embodiment of the present invention is a hardware product, such as VR glasses, related to the field of virtual reality technologies. A possible structure of the VR glasses is shown in FIG. 2. The virtual reality technology is a computer simulation system that can create a virtual world and make the virtual world experienced. The virtual reality technology creates a simulated environment by using a computer, which is system simulation of a physical behavior and an interactive three-dimensional dynamic visual, and the technology enables a user to be immersed in the environment.

The inverse filtering (inverse filter) processing in this embodiment of the present invention is also referred to as deconvolution (deconvolution) processing. A principle is mainly to combine light-field display optics and a computer operation, and adjust luminous intensity of a pixel in a played image according to the visual acuity status of the user, so as to present a clear image to the user.

In a possible implementation, a cover film including a pinhole array is disposed on the screen of the virtual reality device. When light emitted by the pixel in the image played on the screen passes through the pinhole array in the cover film, the image may be warped, so that users with different visual acuity can view a clear image.

For example, a possible implementation structure of the cover film includes two layers of transparent plastic slices, and a pinhole array screen is disposed between the two layers of transparent plastic slices. A size of each pinhole is approximately 75 micrometers, and a distance between two adjacent pinholes is approximately 390 micrometers.

In this embodiment of the present invention, the inverse filtering processing is performed, by using a digital visual acuity correction technology (that is, by means of deconvolution), on the image played on the virtual reality device, that is, a blur filter corresponding to the visual acuity of the user is added to the screen, so that a feature such as intensity of the pixel in the played image can be adjusted according to specific visual impairment of different users that is represented as different myopic, hyperopic, or astigmatic degrees, and the user of the virtual reality device can view a clear image.

In this embodiment of the present invention, the filtering parameter corresponding to the visual acuity of the user is determined according to the visual acuity status of the user of the virtual reality device in the following two optional implementations.

Manner 1: Determine, according to a preset correspondence, the filtering parameter corresponding to the visual acuity of the user, where the correspondence includes a correspondence between visual acuity and a filtering parameter.

In an example of a myopic degree, a possible implementation of the preset correspondence is shown in Table 1.

TABLE 1

| Myopic degree | Filtering parameter |
| --- | --- |
| −1.00 diopter | Filtering parameter 1 |
| −2.00 diopters | Filtering parameter 2 |
| −3.00 diopters | Filtering parameter 3 |
| −4.00 diopters | Filtering parameter 4 |
| −5.00 diopters | Filtering parameter 5 |
| −6.00 diopters | Filtering parameter 6 |

For another example, another possible implementation of the preset correspondence is shown in Table 2.

TABLE 2

| Myopic degree | Blur filter |
| --- | --- |
| −1.00 diopter | −1.00-diopter filter |
| −2.00 diopters | −2.00-diopter filter |
| −3.00 diopters | −3.00-diopter filter |
| −4.00 diopters | −4.00-diopter filter |
| −5.00 diopters | −5.00-diopter filter |
| −6.00 diopters | −6.00-diopter filter |

Different blur filters are corresponding to different filtering parameters.

In the manner, before the determining, according to a visual acuity status of a user of the virtual reality device, a filtering parameter corresponding to visual acuity of the user, the method further includes: obtaining the visual acuity of the user of the virtual reality device, which specifically includes the following possible implementations.

Manner a: After a voice collection instruction is received, collect voice information, and determine the visual acuity of the user from the voice information.

In the manner, the user may notify the virtual reality device of the visual acuity of the user by sending the voice information. For example, the user first triggers a voice collection function of the virtual reality device, that is, sends the voice collection instruction to the virtual reality device, and then notifies the virtual reality device of the visual acuity of the user in a voice form. Correspondingly, after the voice collection instruction is received, the voice information is collected, and the collected voice information is parsed, to determine the visual acuity of the user from the voice information.

Manner b: Determine the visual acuity of the user according to received input information after an information input instruction is received.

In the manner, the user may notify the virtual reality device of the visual acuity of the user by entering a myopic degree of the user. For example, the user first triggers a write function of the virtual reality device or a write function of an external device connected to the virtual reality device, that is, sends the information input instruction to the virtual reality device; and then enters the visual acuity of the user to an input interface provided by the virtual reality device or an input interface provided by the external device, so that the virtual reality device determines the visual acuity of the user. If the user enters the visual acuity of the user to the input interface provided by the external device, the external device generates corresponding information, and sends the corresponding information to the virtual reality device, so that the virtual reality device determines the visual acuity of the user.

Correspondingly, the visual acuity of the user is determined according to the received input information after the information input instruction is received.

Manner 2: The virtual reality device determines, in an automatic calibration manner, the filtering parameter corresponding to the visual acuity of the user. Details are as follows:

After a calibration instruction is received, a video sample is played on the screen of the virtual reality device;

inverse filtering processing is sequentially performed on an image in the video sample according to filtering parameters in a filtering parameter set, and an image obtained after the inverse filtering processing is displayed on the screen; and it is determined that the user views a clear image, and a filtering parameter used for the current image is determined as the filtering parameter corresponding to the visual acuity of the user.

For example, the nearsighted user uses the virtual reality device. It is assumed that the preset filtering parameter set includes three filtering parameters: a filtering parameter 1, a filtering parameter 2, and a filtering parameter 3. The filtering parameter 1 is equivalent to a −1.00-diopter filter, the filtering parameter 2 is equivalent to a −2.00-diopter filter, and the filtering parameter 3 is equivalent to a −3.00-diopter filter. An automatic calibration process is as follows:

When the video sample is played, inverse filtering processing is first performed on the image in the video sample according to the filtering parameter 1; an image obtained after the inverse filtering processing is displayed on the screen; and it is determined whether the user can view a clear image. If the user can view a clear image, the filtering parameter 1 is determined as a filtering parameter corresponding to the myopic degree. If the user cannot view a clear image, inverse filtering processing is performed on the image in the video sample according to the filtering parameter 2; an image obtained after the inverse filtering processing is displayed on the screen; and it is determined whether the user can view a clear image. If the user can view a clear image, the filtering parameter 2 is determined as a filtering parameter corresponding to the myopic degree. If the user cannot view a clear image, inverse filtering processing is performed on the image in the video sample according to the filtering parameter 3; an image obtained after the inverse filtering processing is displayed on the screen; and it is determined whether the user can view a clear image. The foregoing operations are repeated until it is determined whether the user can view a clear image.

In the manner, after the sequentially performing inverse filtering processing on an image in the video sample according to filtering parameters in a filtering parameter set, it is determined that the user does not view a clear image, and the filtering parameters in the filtering parameter set are updated;

inverse filtering processing is sequentially performed on the image in the video sample according to updated filtering parameters in the filtering parameter set, and an image obtained after the inverse filtering processing is displayed on the screen; and it is determined that the user views a clear image, and a filtering parameter used for the current image is determined as the filtering parameter corresponding to the visual acuity of the user.

For example, the filtering parameters in the filtering parameter set may be updated in the following manner.

Manner A: Adjust the filtering parameters in the filtering parameter set according to a specified step.

In the manner, an updated filtering parameter set includes only adjusted filtering parameters, or an updated filtering parameter set includes unadjusted filtering parameters and adjusted filtering parameters.

For example, it is assumed that the filtering parameter set includes three filtering parameters: a filtering parameter 1, a filtering parameter 2, and a filtering parameter 3. The filtering parameter 1 is equivalent to a −1.00-diopter filter, the filtering parameter 2 is equivalent to a −2.00-diopter filter, and the filtering parameter 3 is equivalent to a −3.00-diopter filter. The filtering parameter 1 is adjusted to a filtering parameter, denoted as a filtering parameter 1', corresponding to a −1.50-diopter filter. The filtering parameter 2 is adjusted to a filtering parameter, denoted as a filtering parameter 2', corresponding to a −2.50-diopter filter. The filtering parameter 3 is adjusted to a filtering parameter, denoted as a filtering parameter 3', corresponding to a −3.50-diopter filter. In this case, an updated filtering parameter set may include only the filtering parameter 1', the filtering parameter 2', and the filtering parameter 3', or may include the filtering parameter 1, the filtering parameter 2, the filtering parameter 3, the filtering parameter 1', the filtering parameter 2', and the filtering parameter 3'.

In the manner, to avoid frequently updating the filtering parameter set, after the filtering parameters in the filtering parameter set are polled for N times, if it is still determined that the user does not view a clear image, the filtering parameters in the filtering parameter set are updated.

In the manner, the step of determining that the user views a clear image includes: after a determining instruction is received, determining that the user views a clear image.

Specifically, in the automatic calibration process, after viewing a clear image, the user sends the determining instruction, to notify the virtual reality device that the user views a clear image.

Correspondingly, if the virtual reality device receives the determining instruction, it is determined that the user views a clear image, or if the virtual reality device does not receive the determining instruction, it is determined that the user does not view a clear image.

In this embodiment of the present invention, the user may indicate, in a manner other than the manner of sending or not sending the determining instruction, whether the user views a clear image. For example, the virtual reality device may determine, according to an obtained change of pupils in eyeballs of the user, whether the user views a clear image.

Figure 3:
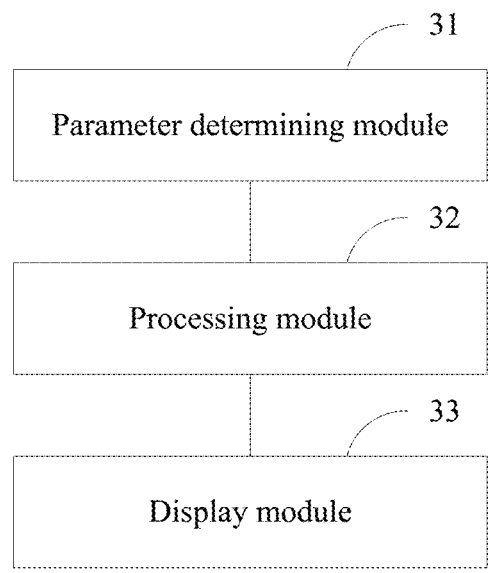
FIG. 3 is a schematic diagram of an image processing apparatus in a virtual reality device according to Embodiment 2 of the present invention.

Based on a same invention concept, Embodiment 2 of the present invention provides an image processing apparatus in a virtual reality device. As shown in FIG. 3, the apparatus includes:

a parameter determining module 31, configured to determine, according to a visual acuity status of a user of the virtual reality device, a filtering parameter corresponding to visual acuity of the user;

a processing module 32, configured to: for an image played on the virtual reality device, perform inverse filtering processing on the image according to the determined filtering parameter; and a display module 33, configured to display an image obtained after the inverse filtering processing.

In a possible implementation, the parameter determining module is specifically configured to:

determine, according to a preset correspondence, the filtering parameter corresponding to the visual acuity of the user, where the correspondence includes a correspondence between visual acuity and a filtering parameter.

In a possible implementation, the parameter determining module is further configured to:

after a voice collection instruction is received, collect voice information, and determine the visual acuity of the user from the voice information; or determine the visual acuity of the user according to received input information after an information input instruction is received.

In a possible implementation, the processing module is specifically configured to:

after a calibration instruction is received, control the display module to play a video sample;

sequentially perform inverse filtering processing on an image in the video sample according to filtering parameters in a filtering parameter set, and control the display module to display an image obtained after the inverse filtering processing; and determine that the user views a clear image, and control the parameter determining module to determine, as the filtering parameter corresponding to the visual acuity of the user, a filtering parameter used for the current image.

In a possible implementation, the processing module is further configured to:

determine that the user does not view a clear image, and update the filtering parameters in the filtering parameter set;

sequentially perform inverse filtering processing on the image in the video sample according to updated filtering parameters in the filtering parameter set, and control the display module to display an image obtained after the inverse filtering processing; and determine that the user views a clear image, and control the parameter determining module to determine, as the filtering parameter corresponding to the visual acuity of the user, a filtering parameter used for the current image.

In a possible implementation, the processing module is specifically configured to: after a determining instruction is received, determine that the user views a clear image.

In a possible implementation, the apparatus is the virtual reality device; or the apparatus is disposed in the virtual reality device, and the terminal is connected to the virtual reality device by using an interface.

Figure 4:
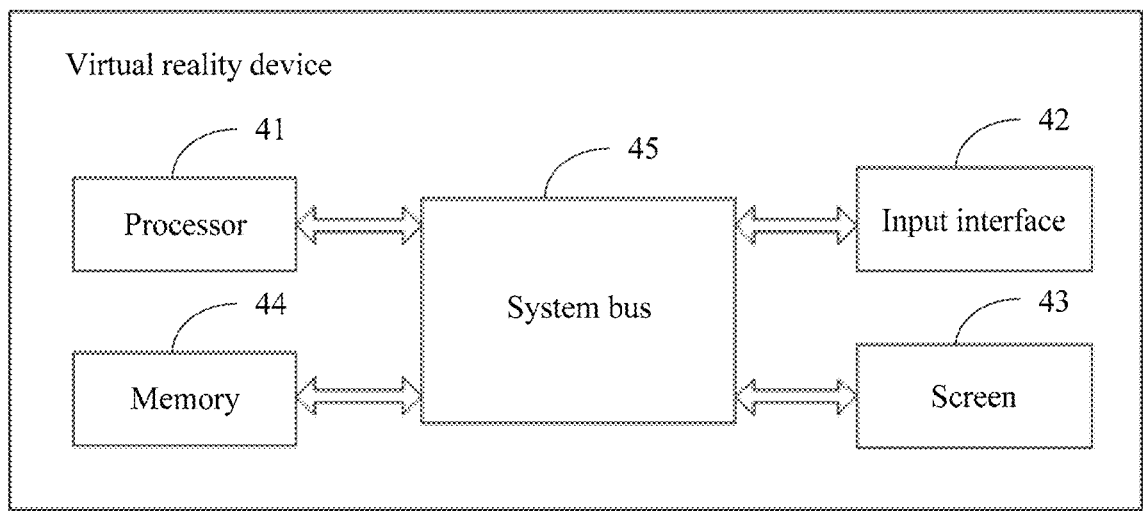
FIG. 4 is a schematic diagram of a virtual reality device according to Embodiment 3 of the present invention.

Based on a same invention concept, Embodiment 3 of the present invention provides a virtual reality device. As shown in FIG. 4, the virtual reality device includes a processor 41, an input interface 42, a screen 43, a memory 44, and a system bus 45.

The processor 41 is responsible for a logical operation and processing. When the virtual reality device runs, the processor 41 reads a program in the memory 44, to perform the following operations: determining, according to a visual acuity status of a user of the virtual reality device, a filtering parameter corresponding to visual acuity of the user; and for an image played on the virtual reality device, performing inverse filtering processing on the image according to the determined filtering parameter; and the screen 43 is configured to display, under control of the processor 41, an image obtained after the inverse filtering processing.

In FIG. 4, the memory 44 includes a memory and a hard disk, and may store data used by the processor 41 to perform an operation. The input interface 42 is configured to read data under control of the processor 41. A bus architecture may include any quantity of interconnected buses and bridges, and specifically link together various circuits of one or more processors represented by the processor 41 and the memory and the hard disk that are represented by the memory 44. The bus architecture may further link together various other circuits such as a peripheral device, a voltage regulator, and a power management circuit, which is well known in the art, and therefore no further description is provided in this specification.

In a possible implementation, the processor reads the program in the memory, to specifically perform the following operation:

determining, according to a preset correspondence, the filtering parameter corresponding to the visual acuity of the user, where the correspondence includes a correspondence between visual acuity and a filtering parameter.

In a possible implementation, the processor reads the program in the memory, to further perform the following operation:

after the input interface receives a voice collection instruction, collecting voice information, and determining the visual acuity of the user from the voice information; or determining the visual acuity of the user according to received input information after an information input instruction is received.

In a possible implementation, the processor reads the program in the memory, to specifically perform the following operations:

after the input interface receives a calibration instruction, playing a video sample on the screen of the virtual reality device; sequentially performing inverse filtering processing on an image in the video sample according to filtering parameters in a filtering parameter set, and displaying, on the screen, an image obtained after the inverse filtering processing; and determining that the user views a clear image, and determining, as the filtering parameter corresponding to the visual acuity of the user, a filtering parameter used for the current image.

In a possible implementation, the processor reads the program in the memory, to further perform the following operations:

after the inverse filtering processing is sequentially performed on the image in the video sample according to the filtering parameters in the filtering parameter set, determining that the user does not view a clear image, and updating the filtering parameters in the filtering parameter set; sequentially performing inverse filtering processing on the image in the video sample according to updated filtering parameters in the filtering parameter set, and displaying, on the screen, an image obtained after the inverse filtering processing; and determining that the user views a clear image, and determining, as the filtering parameter corresponding to the visual acuity of the user, a filtering parameter used for the current image.

In a possible implementation, the processor reads the program in the memory, to specifically perform the following operation: after the input interface receives a determining instruction, determining that the user views a clear image.

In a possible implementation, a cover film including a pinhole array is disposed on the screen.

Figure 5:
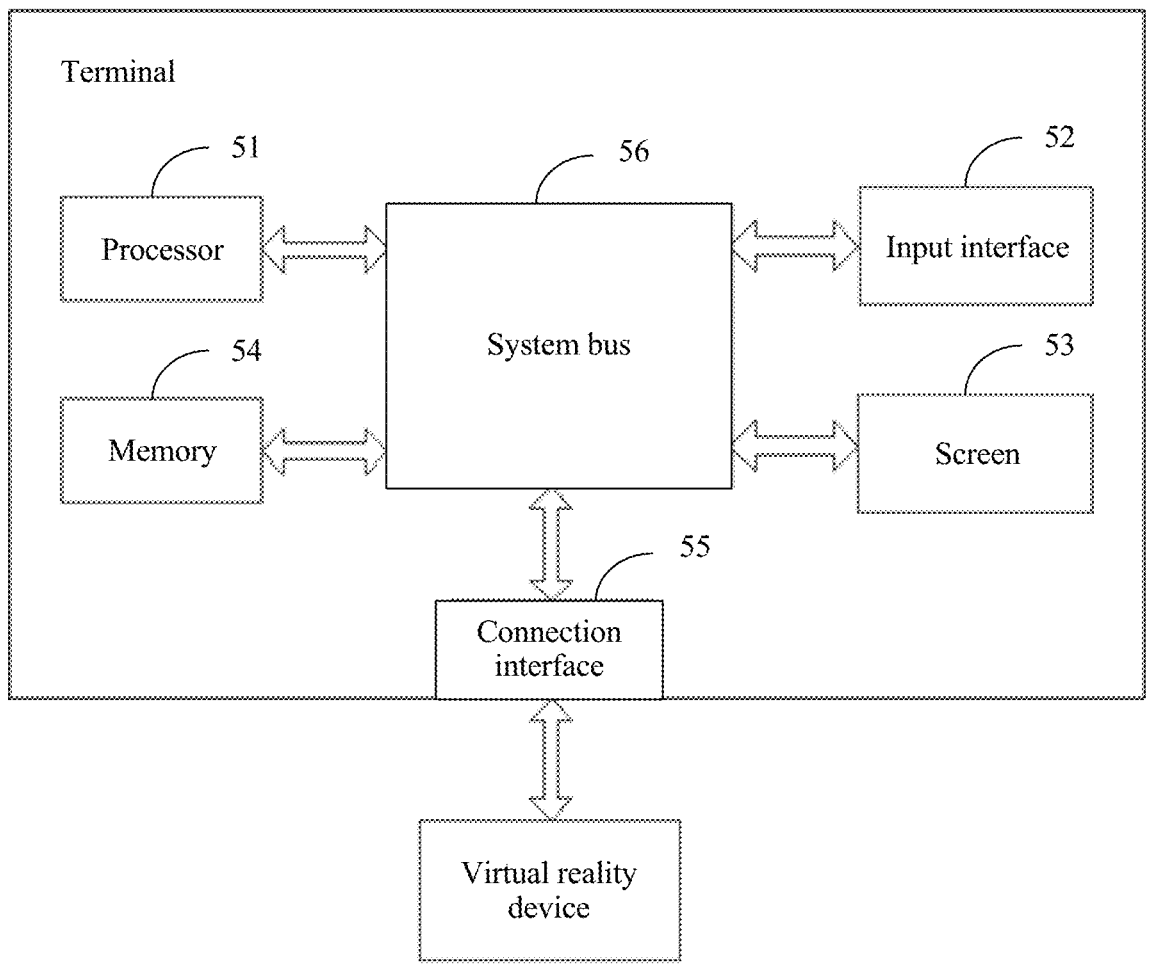
FIG. 5 is a schematic diagram of a terminal according to Embodiment 4 of the present invention.

Based on a same invention concept, Embodiment 4 of the present invention provides a terminal. As shown in FIG. 5, the terminal is disposed in a virtual reality device, and the terminal includes a processor 51, an input interface 52, a screen 53, a memory 54, a connection interface 55, and a system bus 56.

The processor 51 is responsible for a logical operation and processing. When the terminal runs, the processor 51 reads a program in the memory 54, to perform the following operations: determining, according to a visual acuity status of a user of the virtual reality device, a filtering parameter corresponding to visual acuity of the user; and for an image played on the virtual reality device, performing inverse filtering processing on the image according to the determined filtering parameter;

the screen 53 is configured to display, under control of the processor 51, an image obtained after the inverse filtering processing; and the input interface 52 is configured to connect to the virtual reality device.

In FIG. 5, the memory 54 includes a memory and a hard disk, and may store data used by the processor 51 to perform an operation. The input interface 52 is configured to read data under control of the processor 51. The connection interface 55 is configured to communicate with the virtual reality device under control of the processor 51. A bus architecture may include any quantity of interconnected buses and bridges, and specifically link together various circuits of one or more processors represented by the processor 51 and the memory and the hard disk that are represented by the memory 54. The bus architecture may further link together various other circuits such as a peripheral device, a voltage regulator, and a power management circuit, which is well known in the art, and therefore no further description is provided in this specification.

In a possible implementation, the processor reads the program in the memory, to specifically perform the following operation:

determining, according to a preset correspondence, the filtering parameter corresponding to the visual acuity of the user, where the correspondence includes a correspondence between visual acuity and a filtering parameter.

In a possible implementation, the processor reads the program in the memory, to further perform the following operation:

after the input interface receives a voice collection instruction, collecting voice information, and determining the visual acuity of the user from the voice information; or determining the visual acuity of the user according to received input information after the input interface receives an information input instruction.

In a possible implementation, the processor reads the program in the memory, to specifically perform the following operations:

after the input interface receives a calibration instruction, playing a video sample on the screen of the virtual reality device;

sequentially performing inverse filtering processing on an image in the video sample according to filtering parameters in a filtering parameter set, and displaying, on the screen, an image obtained after the inverse filtering processing; and determining that the user views a clear image, and determining, as the filtering parameter corresponding to the visual acuity of the user, a filtering parameter used for the current image.

In a possible implementation, the processor reads the program in the memory, to further perform the following operations:

after the inverse filtering processing is sequentially performed on the image in the video sample according to the filtering parameters in the filtering parameter set, determining that the user does not view a clear image, and updating the filtering parameters in the filtering parameter set;

sequentially performing inverse filtering processing on the image in the video sample according to updated filtering parameters in the filtering parameter set, and displaying, on the screen, an image obtained after the inverse filtering processing; and determining that the user views a clear image, and determining, as the filtering parameter corresponding to the visual acuity of the user, a filtering parameter used for the current image.

In a possible implementation, the processor reads the program in the memory, to specifically perform the following operation: after the input interface receives a determining instruction, determining that the user views a clear image.

In a possible implementation, the terminal further includes a cover film that includes a pinhole array and that is disposed on the screen; or the cover film including the pinhole array is disposed on a location in which the screen is located in the virtual reality device.

Persons skilled in the art should understand that the embodiments of the present invention may be provided as a method, a system, or a computer program product. Therefore, the present invention may use a form of hardware only embodiments, software only embodiments, or embodiments with a combination of software and hardware. Moreover, the present invention may use a form of a computer program product that is implemented on one or more computer-usable storage media (including but not limited to a disk memory, a CD-ROM, an optical memory, and the like) that include computer-usable program code.

The present invention is described with reference to the flowcharts and/or block diagrams of the method, the device (system), and the computer program product according to the embodiments of the present invention. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of another programmable data processing device to generate a machine, so that the instructions executed by the computer or the processor of the another programmable data processing device generate an apparatus for implementing a specific function in one or more processes in the flowcharts and/or in one or more blocks in the block diagrams.

These computer program instructions may be stored in a computer readable memory that can instruct a computer or another programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although some preferred embodiments of the present invention have been described, persons skilled in the art can make changes and modifications to these embodiments once they learn the basic inventive concept. Therefore, the following claims are intended to be construed as to cover the preferred embodiments and all changes and modifications falling within the scope of the present invention.

Obviously, persons skilled in the art can make various modifications and variations to the present invention without departing from the spirit and scope of the present invention. The present invention is intended to cover these modifications and variations provided that they fall within the scope of protection defined by the following claims and their equivalent technologies.

What is claimed is:

1. An image processing method in a virtual reality device, wherein the method comprises:
    obtaining, by the virtual reality device, a visual acuity status of a user of the virtual reality device, wherein the visual acuity status of the user is determined based on visual acuity of the user including at least one of myopia, hyperopia, or astigmatism;
    determining, according to the visual acuity status of the user of the virtual reality device, a filtering parameter corresponding to the visual acuity of the user, wherein determining the filtering parameter comprises:
    after a calibration instruction is received, playing a video sample on the screen of the virtual reality device;
    sequentially performing inverse filtering processing on an image in the video sample according to filtering parameters in a filtering parameter set;
    displaying, on the screen, an image obtained after the inverse filtering processing; and
    determining that the user views a clear image, and determining, as the filtering parameter corresponding to the visual acuity of the user, a filtering parameter used for the current image;
    performing, on an image played on the virtual reality device, inverse filtering processing according to the determined filtering parameter; and
    displaying, on a screen of the virtual reality device, an image obtained after the inverse filtering processing.

2. The method according to claim 1, wherein the determining, according to the visual acuity status of the user of the virtual reality device, a filtering parameter corresponding to the visual acuity of the user comprises:
    determining, according to a preset correspondence, the filtering parameter corresponding to the visual acuity of the user, wherein the correspondence comprises a correspondence between visual acuity and a filtering parameter.

3. The method according to claim 2, wherein before the determining, according to the visual acuity status of the user of the virtual reality device, a filtering parameter corresponding to the visual acuity of the user, the method further comprises one of:
    after a voice collection instruction is received, collecting voice information, and determining the visual acuity of the user from the voice information; or
    determining the visual acuity of the user according to received input information after an information input instruction is received.

4. The method according to claim 1, wherein the method further comprises:
    after the sequentially performing inverse filtering processing on an image in the video sample according to filtering parameters in a filtering parameter set, determining that the user does not view a clear image, and updating the filtering parameters in the filtering parameter set;
    sequentially performing inverse filtering processing on the image in the video sample according to updated filtering parameters in the filtering parameter set;
    displaying, on the screen, an image obtained after the inverse filtering processing; and
    determining that the user views a clear image, and determining, as the filtering parameter corresponding to the visual acuity of the user, a filtering parameter used for the current image.

5. The method according to claim 1, wherein the determining that the user views a clear image comprises, after a determining instruction is received, determining that the user views a clear image.

6. A virtual reality device, wherein the virtual reality device comprises at least one processor, an input interface, a screen, a memory, and a system bus; wherein:
    the at least one processor reads a program in the memory, to perform the following operations:
        obtaining a visual acuity status of a user of the virtual reality device, wherein the visual acuity status of the user is determined based on visual acuity of the user including at least one of myopia, hyperopia, or astigmatism;
        determining, according to the visual acuity status of the user of the virtual reality device, a filtering parameter corresponding to the visual acuity of the user, wherein determining the filtering parameter comprises:
        after the input interface receives a calibration instruction, playing a video sample on the screen of the virtual reality device;
        sequentially performing inverse filtering processing on an image in the video sample according to filtering parameters in a filtering parameter set;
        displaying, on the screen, an image obtained after the inverse filtering processing; and
        determining that the user views a clear image, and determining, as the filtering parameter corresponding to the visual acuity of the user, a filtering parameter used for the current image; and
    performing, for an image played on the virtual reality device, inverse filtering processing according to the determined filtering parameter; and
    the screen is configured to display, under control of the at least one processor, an image obtained after the inverse filtering processing.

7. The device according to claim 6, wherein the at least one processor reads the program in the memory, to perform the following operation:
    determining, according to a preset correspondence, the filtering parameter corresponding to the visual acuity of the user, wherein the correspondence comprises a correspondence between visual acuity and a filtering parameter.

8. The device according to claim 7, wherein the at least one processor reads the program in the memory, to further perform one of the following operations:
    after the input interface receives a voice collection instruction, collecting voice information, and determining the visual acuity of the user from the voice information; or
    determining the visual acuity of the user according to received input information after an information input instruction is received.

9. The device according to claim 6, wherein the at least one processor reads the program in the memory, to further perform the following operations:

after the inverse filtering processing is sequentially performed on the image in the video sample according to the filtering parameters in the filtering parameter set, determining that the user does not view a clear image, and updating the filtering parameters in the filtering parameter set;

sequentially performing inverse filtering processing on the image in the video sample according to updated filtering parameters in the filtering parameter set;

displaying, on the screen, an image obtained after the inverse filtering processing; and determining that the user views a clear image, and determining, as the filtering parameter corresponding to the visual acuity of the user, a filtering parameter used for the current image.

10. The device according to claim 6, wherein the at least one processor reads the program in the memory, to perform the following operation:

after the input interface receives a determining instruction, determining that the user views a clear image.

11. The device according to claim 6, wherein a cover film comprising a pinhole array is disposed on the screen.

12. A terminal, wherein the terminal is disposed in a virtual reality device, and the terminal comprises at least one processor, an input interface, a screen, a memory, a connection interface, and a system bus, wherein:

the at least one processor reads a program in the memory, to perform the following operations:

obtaining a visual acuity status of a user of the virtual reality device, wherein the visual acuity status of the user is determined based on visual acuity of the user including at least one of myopia, hyperopia, or astigmatism;

determining, according to the visual acuity status of the user of the virtual reality device, a filtering parameter corresponding to the visual acuity of the user, wherein determining the filtering parameter comprises:

after the input interface receives a calibration instruction, playing a video sample on the screen of the virtual reality device;

sequentially performing inverse filtering processing on an image in the video sample according to filtering parameters in a filtering parameter set, and displaying, on the screen, an image obtained after the inverse filtering processing; and determining that the user views a clear image, and determining, as the filtering parameter corresponding to the visual acuity of the user, a filtering parameter used for the current image; and performing, for an image played on the virtual reality device, inverse filtering processing according to the determined filtering parameter;

the screen is configured to display, under control of the at least one processor, an image obtained after the inverse filtering processing; and the connection interface is configured to connect to the virtual reality device.

13. The terminal according to claim 12, wherein the at least one processor reads the program in the memory, to perform the following operation:

determining, according to a preset correspondence, the filtering parameter corresponding to the visual acuity of the user, wherein the correspondence comprises a correspondence between visual acuity and a filtering parameter.

14. The terminal according to claim 13, wherein the at least one processor reads the program in the memory, to further perform the following operation:

after the input interface receives a voice collection instruction, collecting voice information, and determining the visual acuity of the user from the voice information; or determining the visual acuity of the user according to received input information after the input interface receives an information input instruction.

15. The terminal according to claim 12, wherein the at least one processor reads the program in the memory, to further perform the following operations:

after the inverse filtering processing is sequentially performed on the image in the video sample according to the filtering parameters in the filtering parameter set, determining that the user does not view a clear image, and updating the filtering parameters in the filtering parameter set;

sequentially performing inverse filtering processing on the image in the video sample according to updated filtering parameters in the filtering parameter set, and displaying, on the screen, an image obtained after the inverse filtering processing; and determining that the user views a clear image, and determining, as the filtering parameter corresponding to the visual acuity of the user, a filtering parameter used for the current image.

16. The terminal according to claim 12, wherein the processor reads the program in the memory, to perform the following operation: after the input interface receives a determining instruction, determining that the user views a clear image.

17. The terminal according to claim 12, wherein the terminal further comprises a cover film that comprises a pinhole array and that is disposed on the screen; or the cover film comprising the pinhole array is disposed on a location in which the screen is located in the virtual reality device.

* * * * *